US012753672B2

(12) United States Patent
Toh et al.

(10) Patent No.: US 12,753,672 B2
(45) Date of Patent: Oct. 6, 2026

(54) GARTER SPRING INCLUDING SPACER ELEMENTS

(71) Applicant: Halliburton Energy Services, Inc., Houston, TX (US)

(72) Inventors: Andrew Wei Xue Toh, Singapore (SG); Scott Wallace, Aberdeen (GB); Ashish Khaparde, Singapore (SG); Anthony Phan, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/985,339

(22) Filed: Dec. 18, 2024

(65) Prior Publication Data

US 2025/0207650 A1 Jun. 26, 2025

Related U.S. Application Data

(60) Provisional application No. 63/612,843, filed on Dec. 20, 2023.

(51) Int. Cl.

| | |
|---|---|
| ***E21B 33/128*** | (2006.01) |
| ***E21B 33/12*** | (2006.01) |
| ***F16F 3/04*** | (2006.01) |

(52) U.S. Cl.

CPC ............ *E21B 33/128* (2013.01); *E21B 33/12* (2013.01); *E21B 33/1216* (2013.01); *F16F 3/04* (2013.01); *F16F 2226/048* (2013.01)

(58) Field of Classification Search

None

See application file for complete search history.

(56) References Cited

U.S. PATENT DOCUMENTS

| | | | | |
|---|---|---|---|---|
| 2,491,003 A * | 12/1949 | Elmore | F16D 43/10 | 267/74 |
| 2,520,937 A * | 9/1950 | Kennard, Jr. | F16F 13/02 | 267/169 |
| 2,675,282 A * | 4/1954 | Ronald | F16C 19/20 | 384/520 |
| 3,037,827 A * | 6/1962 | Kupchick | F16C 33/374 | 384/520 |

(Continued)

FOREIGN PATENT DOCUMENTS

| | | | |
|---|---|---|---|
| CN | 85107849 A * | 4/1986 | F16D 43/12 |
| KR | 102063062 B1 * | 1/2020 | G02B 1/18 |
| WO | WO-2004055415 A1 * | 7/2004 | F16C 33/3706 |

OTHER PUBLICATIONS

KR-102063062-B1: English Machine Translation (Year: 2020).*
CN-85107849-A: English Machine Translation (Year: 1986).*
WO-2004055415-A1: English Machine Translation (Year: 2004).*

*Primary Examiner* — Melanie Torres Williams
(74) *Attorney, Agent, or Firm* — Scott Richardson; Parker Justiss, P.C.

(57) ABSTRACT

Provided is a garter spring, a downhole tool and a well system. The garter spring, in one aspect, includes a coiled spring member having an inside diameter ($ID_1$) and an outside diameter ($OD_1$). The garter spring, in accordance with this aspect, further includes a plurality of spaced balls located within the inside diameter ($ID_1$) of the coiled spring member, as well as ones of spacer elements located in gaps between the plurality of spaced balls.

18 Claims, 14 Drawing Sheets

(56) References Cited

U.S. PATENT DOCUMENTS

| | | | | | |
|---|---|---|---|---|---|
| 3,291,433 | A * | 12/1966 | Rodgers | F16F 3/04 | 248/317 |
| 4,509,763 | A * | 4/1985 | Fischer | E21B 33/1208 | 277/342 |
| 4,880,217 | A | 11/1989 | Navarro, Sr. et al. | | |
| 5,265,890 | A | 11/1993 | Balsells | | |
| 5,311,938 | A | 5/1994 | Hendrickson et al. | | |
| 5,474,309 | A * | 12/1995 | Balsells | H05K 9/0016 | 267/167 |
| 5,482,261 | A | 1/1996 | Ortega | | |
| 7,999,202 | B2 * | 8/2011 | Fujita | H01R 13/17 | 439/840 |
| 9,562,413 | B2 * | 2/2017 | Hiorth | E21B 33/1208 | |
| 2014/0190684 | A1 | 7/2014 | Hiorth | | |
| 2015/0129242 | A1 | 5/2015 | Farquhar | | |
| 2022/0298884 | A1 | 9/2022 | Glad et al. | | |

* cited by examiner

GARTER SPRING INCLUDING SPACER ELEMENTS

CROSS-REFERENCE TO RELATED APPLICATION

This application claims the benefit of U.S. Provisional Application Ser. No. 63/612,843, filed on Dec. 20, 2023, entitled "GARTER SPRING," commonly assigned with this application and incorporated herein by reference in its entirety.

BACKGROUND

In a well, sealing tools, such as bridge plugs, frac plugs and packers, are used to isolate a zone and/or maintain a differential downhole pressure. An unset tool, whose seals are not yet expanded to seal, can be run down in the well's wellbore to a specific depth as part of a well string via tubing or wire. The sealing tool may then be actuated to expand the seals radially to a set state to seal the annular gap between the string and the well. When the seal is no longer needed, if the sealing tool is of a retrievable type, the sealing tool can be retrieved by retracting its seal from the set state back to the unset state.

BRIEF DESCRIPTION

Reference is now made to the following descriptions taken in conjunction with the accompanying drawings, in which:

FIG. 1 illustrates a schematic cross-sectional side view of a well system designed, manufactured and/or operated according to one or more embodiments of the disclosure;

FIGS. 2*a* through 2D illustrate quarter cross-sectional side views of an example retrievable bridge plug at various different operational states, designed, manufactured and/or operated according to one or more embodiments of the disclosure;

Figure 7:
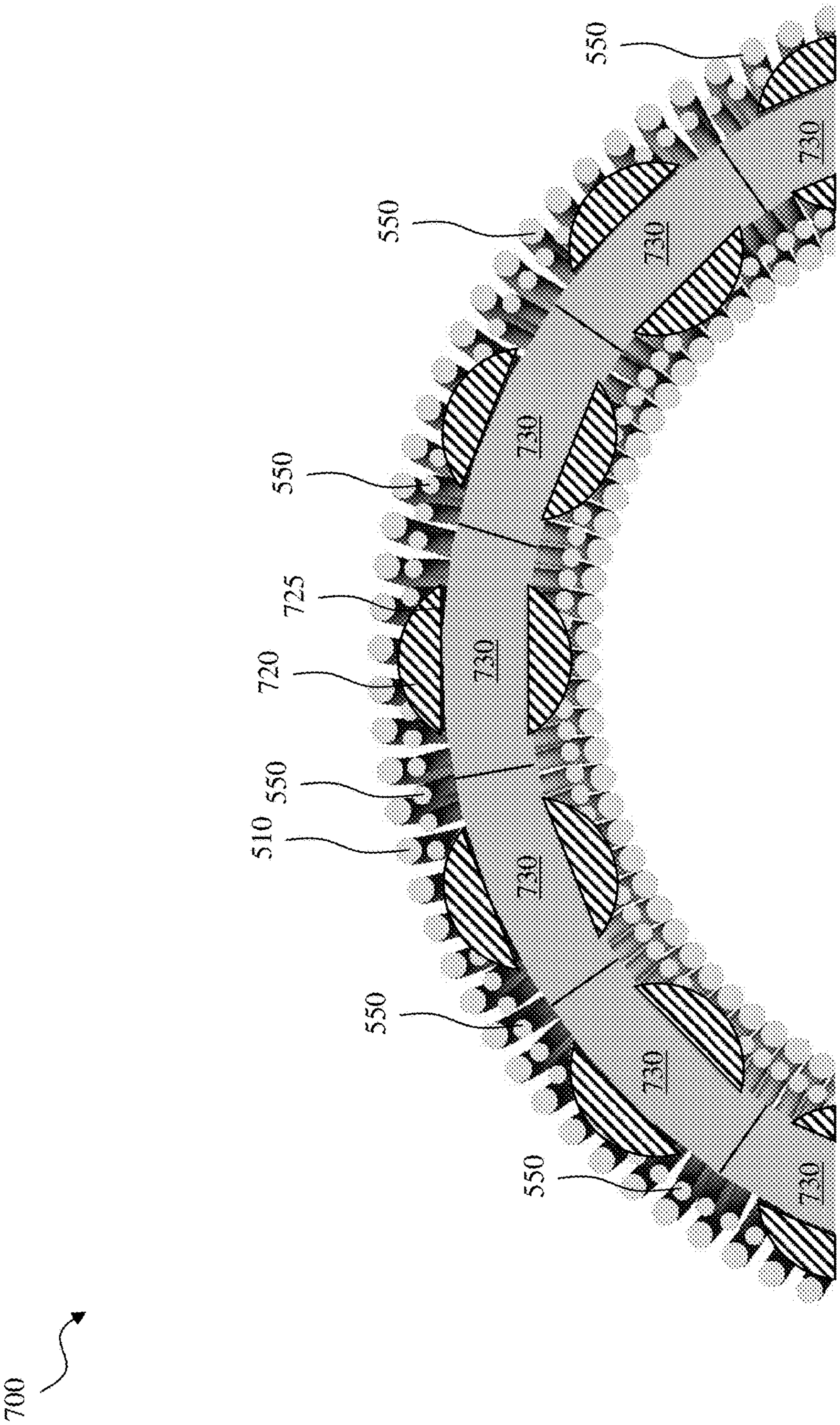
Figure 8A:
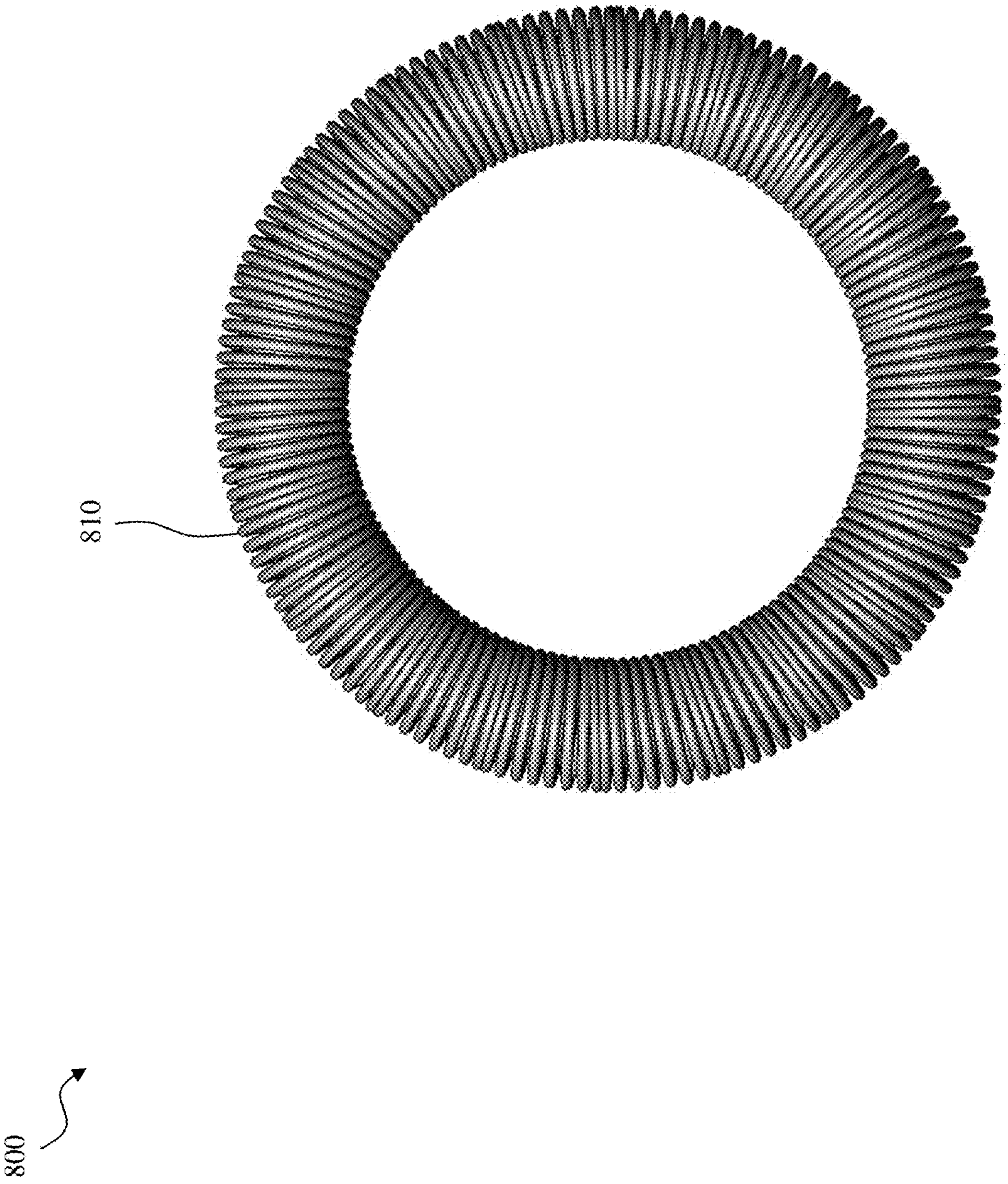
Figure 8B:
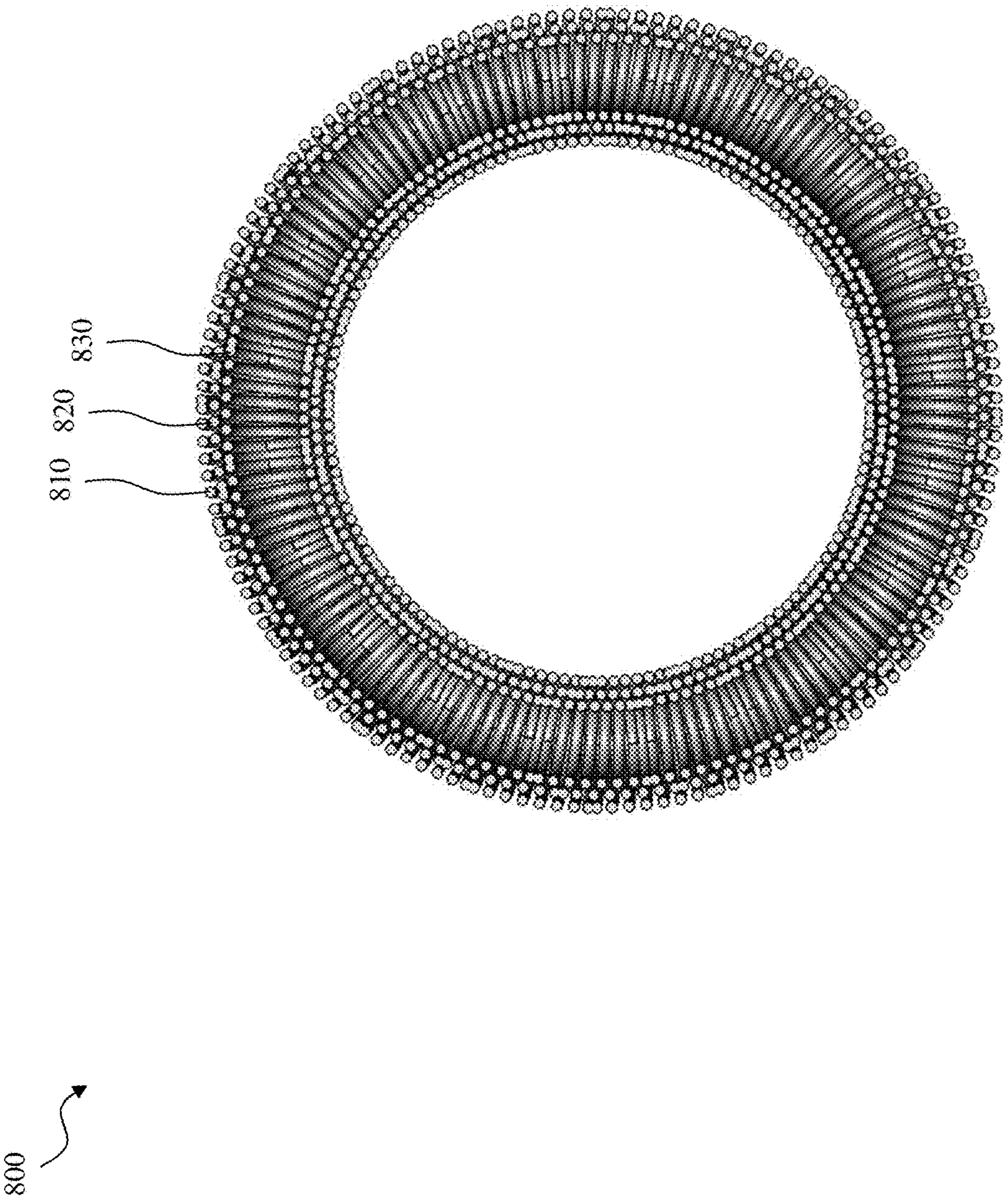
Figure 8C:
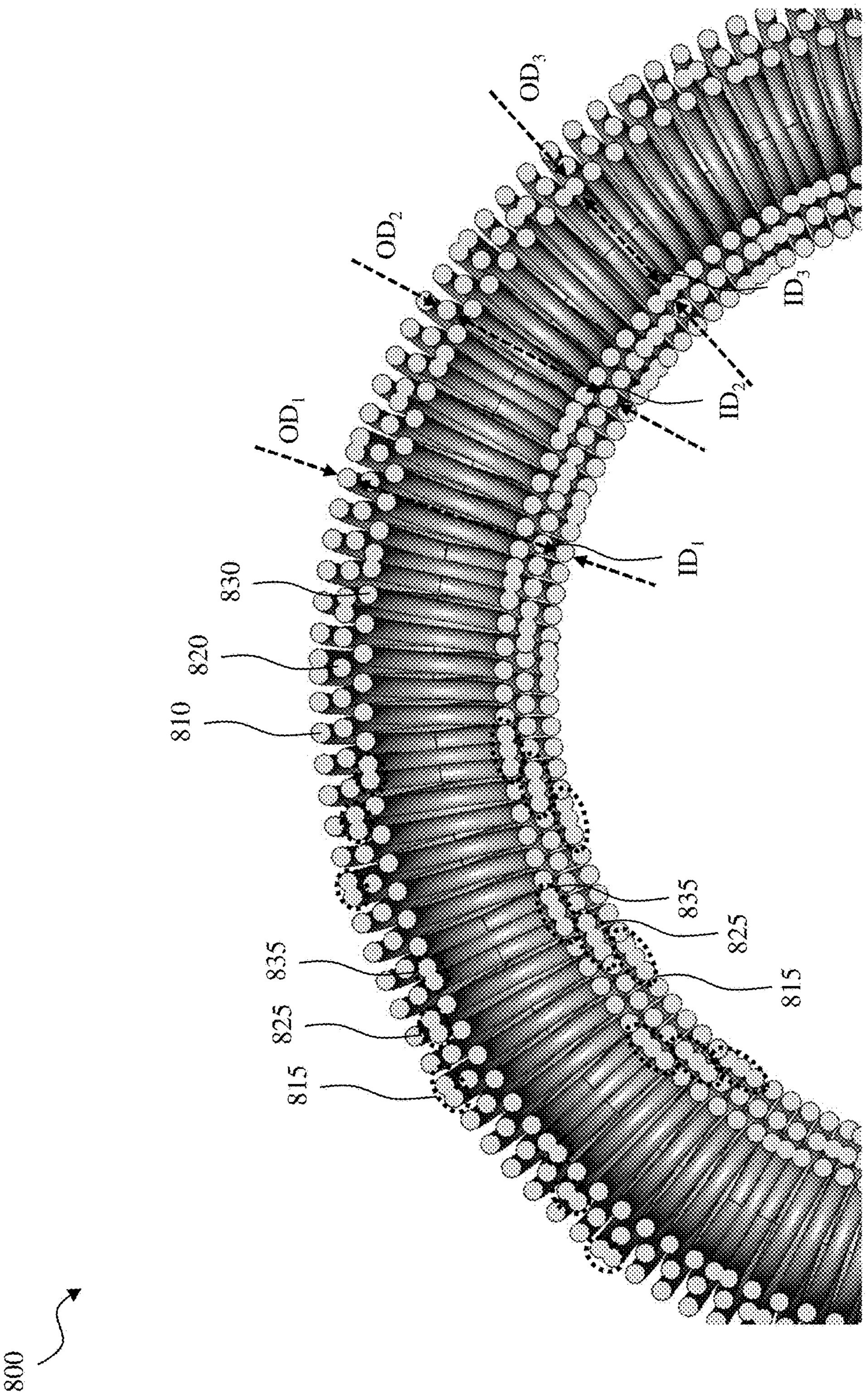

FIG. 7 illustrates a garter spring designed, manufactured and/or operated according to one or more alternative embodiments of the disclosure, and as might be used in the bridge plug disclosed in FIGS. 2A through 2D; and FIGS. 8A through 8C illustrate various different views of a garter spring designed, manufactured and/or operated according to one or more alternative embodiments of the disclosure, and as might be used in the bridge plug disclosed in FIGS. 2A through 2D.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Furthermore, unless otherwise specified, use of the terms "up," "upper," "upward," "uphole," "upstream," or other like terms shall be construed as generally toward the surface of the subterranean formation; likewise, use of the terms "down," "lower," "downward," "downhole," "downstream," or other like terms shall be construed as generally toward the bottom, terminal end of a well, regardless of the wellbore orientation. Use of any one or more of the foregoing terms shall not be construed as denoting positions along a perfectly vertical axis. Additionally, unless otherwise specified, use of the term "subterranean formation" shall be construed as encompassing both areas below exposed earth and areas below earth covered by water such as ocean or fresh water.

Various values and/or ranges are explicitly disclosed in certain embodiments herein. However, values/ranges from any lower limit may be combined with any upper limit to recite a range not explicitly recited. Similarly, values/ranges from any lower limit may be combined with any other lower limit to recite a range not explicitly recited. In the same way, values/ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited. Similarly, an individual value disclosed herein may be combined with another individual value or range disclosed herein to form another range.

The term "substantially XYZ," as used herein, means that it is within 10 percent of perfectly XYZ. The term "significantly XYZ," as used herein, means that it is within 5 percent of perfectly XYZ. The term "ideally XYZ," as used herein, means that it is within 1 percent of perfectly XYZ. The monicker "XYZ" could refer to parallel, perpendicular, alignment, or other relative features disclosed herein.

Figure 1:
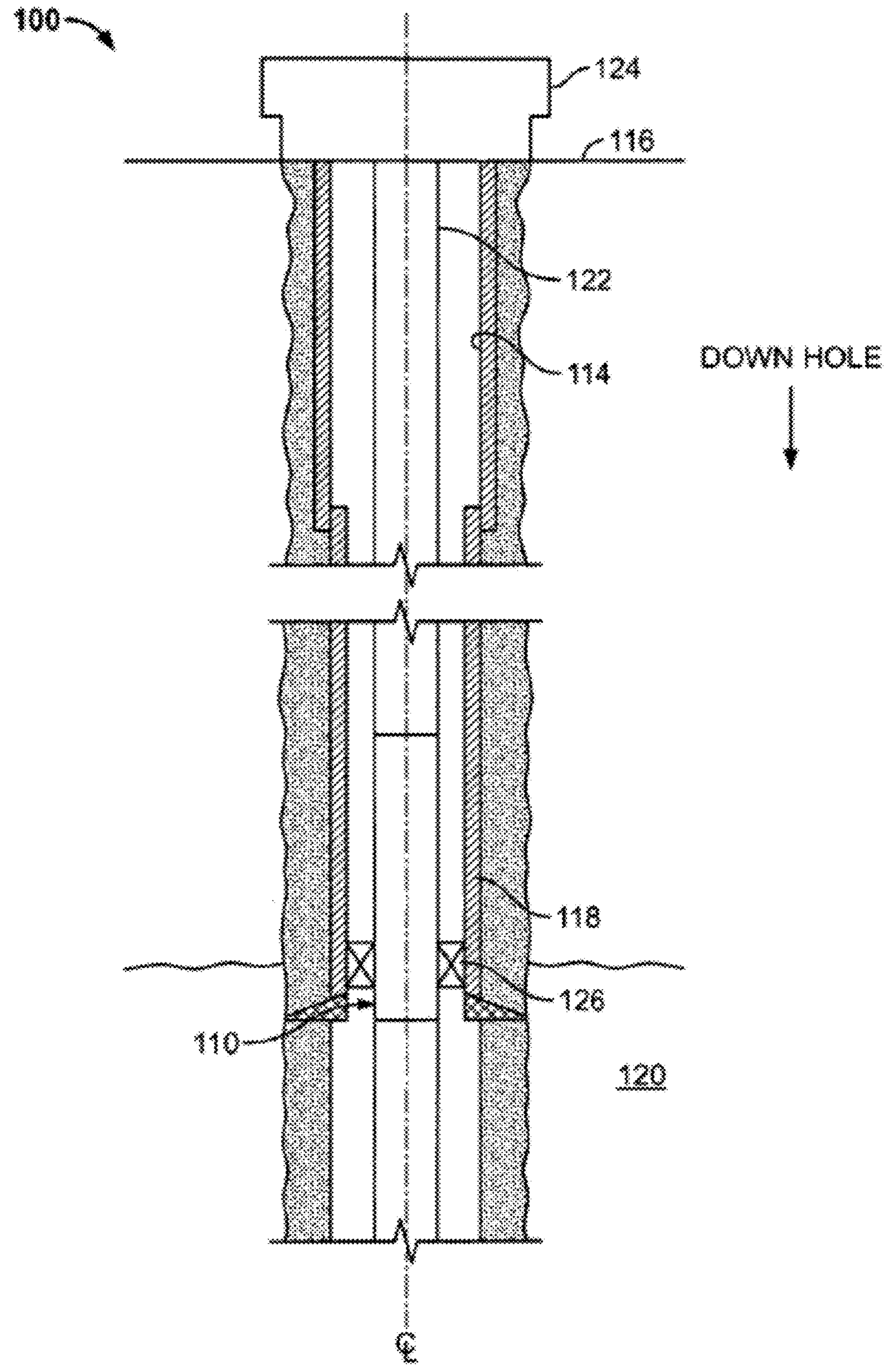

FIG. 1 is a schematic half cross-sectional side view of a well system 100 designed, manufactured and/or operated according to one or more embodiments of the disclosure.

The well system 100 includes a wellbore 114 that extends from a terranean surface 116 into one or more subterranean zones 120. When completed, the well system 100 produces reservoir fluids and/or injects fluids into the subterranean zones 120. In certain instances, the wellbore 114 is lined with casing or liner 118. An example well sealing tool 110 is in a tubing string 122 that extends from a wellhead 124 into the wellbore 114. The tubing string 122 can be coiled tubing and/or a string of joint tubing coupled end to end. For example, the tubing string 122 may be a working string, an injection string, and/or a production string. The sealing tool 110 can include a bridge plug, frac plug, packer and/or other sealing tool, having a seal assembly 126 for sealing against the wellbore 114 wall (e.g., the casing or liner 118, a liner and/or the bare rock in an open hole context). The seal assembly 126 can isolate an interval of the wellbore 114 above the seal assembly 126 from an interval of the wellbore 114 below the seal assembly 126, for example, so that a pressure differential can exist between the intervals.

Figure 2A:
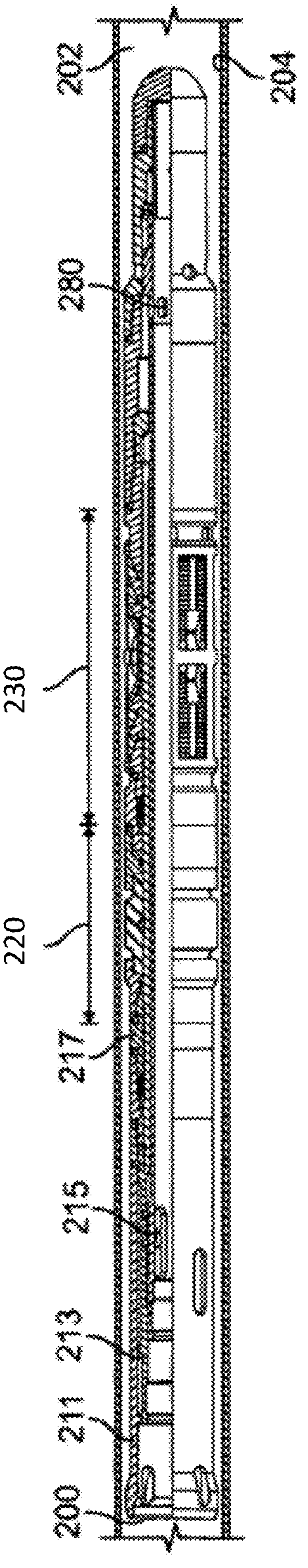
Figure 2B:
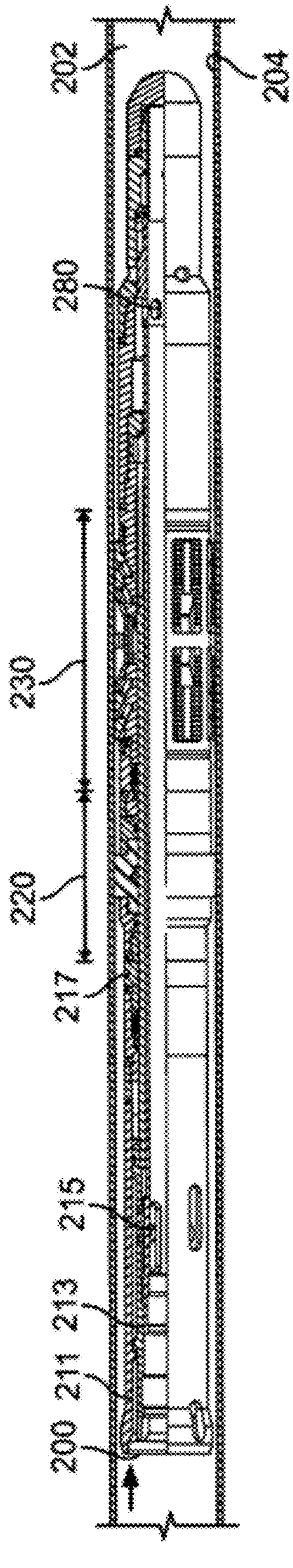
Figure 2C:
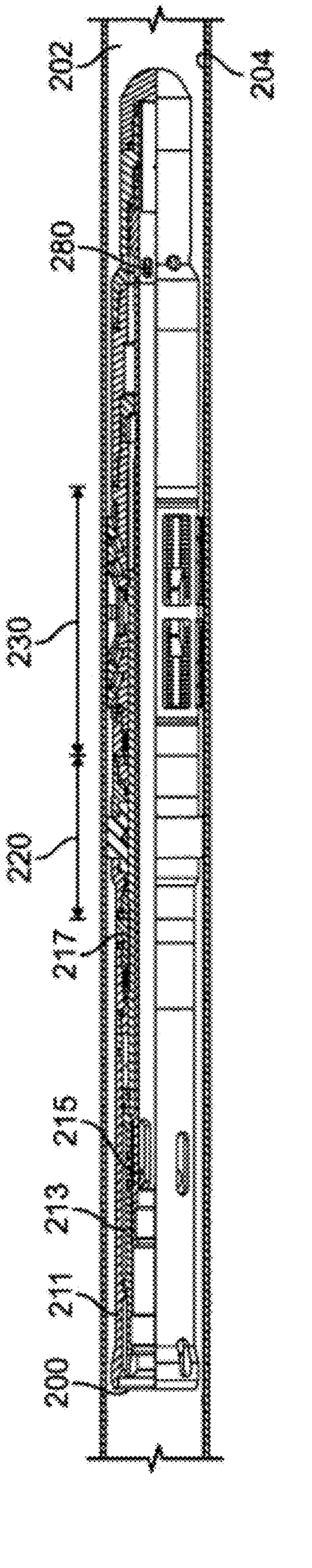
Figure 2D:
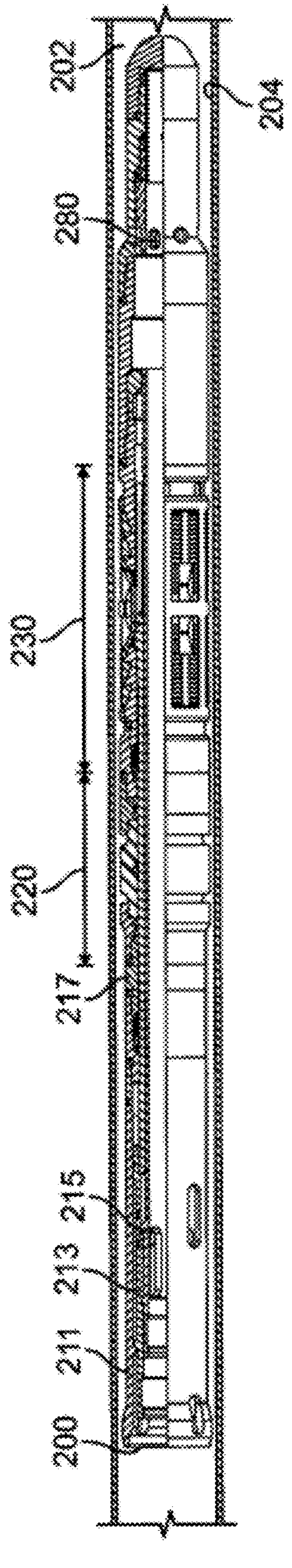

FIGS. 2A through 2D are quarter cross-sectional side views of an example retrievable bridge plug 200 at various different operational states designed, manufactured and/or operated according to one or more embodiments of the disclosure. FIG. 2A illustrates a run-in state for running the bridge plug 200 into a well. FIG. 2B illustrates a set state for sealing an annulus between the bridge plug 200 and a tubular. FIG. 2C illustrates an equalizing state for releasing the bridge plug seal, and FIG. 2D illustrates a retrieving state for retrieving the bridge plug.

The bridge plug 200 can be used as the well sealing tool 110 in the well system 100 of FIG. 1. The bridge plug 200 can be run into the wellbore 202 to a specified depth on a setting tool via tubing (e.g., a coiled tubing, jointed tubing and/or other) or wire (e.g., wireline, slickline, and/or other), and set to grip and seal against the wellbore 202 (and the annulus between the bridge plug 200 and the wellbore wall 204). Thereafter, the setting tool and the tubing or wire can be disconnected from the bridge plug 200 and withdrawn to the terranean surface. In certain instances, the setting tool can be a standard, off-the-shelf setting tool. In other instances, the setting tool can be a proprietary setting tool and/or other tool. The bridge plug 200, in one or more embodiments, is retrievable in that it can be re-engaged by a pulling/setting tool on tubing or wire and unset to a retrieval state where it does not grip or seal against the wellbore wall 204, and thus can be withdrawn to the terranean surface.

Referring first to FIG. 2A, the bridge plug 200 enters the wellbore 202 in a run-in-hole state. The bridge plug 200 includes a setting sleeve 211 (e.g., tubular setting sleeve), a tubular inner mandrel 213, a tubular equalizing sleeve 215, an annular seal assembly 220, and a slip assembly 230. In the context of a bridge plug (e.g., or frac plug), the downhole end of setting sleeve 211 is closed to passage of fluids into the interior center bore of the bridge plug 200. In other instances, the center bore can be open to allow passage of fluids through the bore, for example to or from other tools below. In the run-in-hole state, the seal assembly 220 and the slip assembly 230 are radially compact (e.g., retracted and out of engagement with the wellbore wall 204) to facilitate running the bridge plug 200 into the wellbore 202. The uphole end of the setting sleeve 211, inner mandrel 213 and equalizing sleeve 215 include a profile adapted to be gripped with a setting tool. The inner mandrel 213 and setting sleeve 211 can be translated relative to one another with the setting tool to actuate the seal assembly 220 and the slip assembly 230. For example, comparing FIG. 2A (e.g., the run-in-hole state) to FIG. 2B (e.g., the set state), the inner mandrel 213 has been translated uphole, to the left in FIG. 2B, relative to a portion 217 of the setting sleeve 211 to actuate the seal assembly 220 and the slip assembly 230 to the set state (the setting sleeve 211 is also translated downhole to the right in FIG. 2B). The seal assembly 220 is axially compressed by the setting sleeve 211 that, in turn, compresses and actuates the slip assembly 230.

In FIG. 2B, the set state of the bridge plug 200 is illustrated. In the set state, the seal assembly 220 and the slip assembly 230 are fully axially compressed and radially expanded. The seal assembly 220 is compressed between the setting sleeve 211 and the slip assembly 230 and radially expanded to contact and seal against the wellbore wall 204 and seal the annular gap between the bridge plug 200 and the wellbore 202. The slip assembly 230 is actuated to radially extend to grip the wellbore wall 204 and anchor the bridge plug 200 from axially moving relative to the wellbore 202.

In FIG. 2C, a pressure equalizing stage prior to retrieval of the bridge plug 200 is shown. The equalizing sleeve 215 is carried to translate inside the inner mandrel 213 to align one or more equalizing ports 280 of the sleeve 215 with equalizing ports 280 of the setting sleeve 211. When aligned, for example, via operation of a pulling tool, the equalizing ports 280 allow fluids to bypass the seal assembly 220 for equalizing pressure between the interior and exterior of the bridge plug 200, and thus uphole and downhole of the seal assembly 220. The equalized pressure relieves the seal assembly 220 and the slip assembly 230 from being axially loaded, allowing for retraction of the assemblies 220 and 230 and retrieval of the bridge plug 200. In FIG. 2D, the equalizing sleeve 215 is pulled uphole to retract the seal assembly 220 and the slip assembly 230.

Figure 3A:
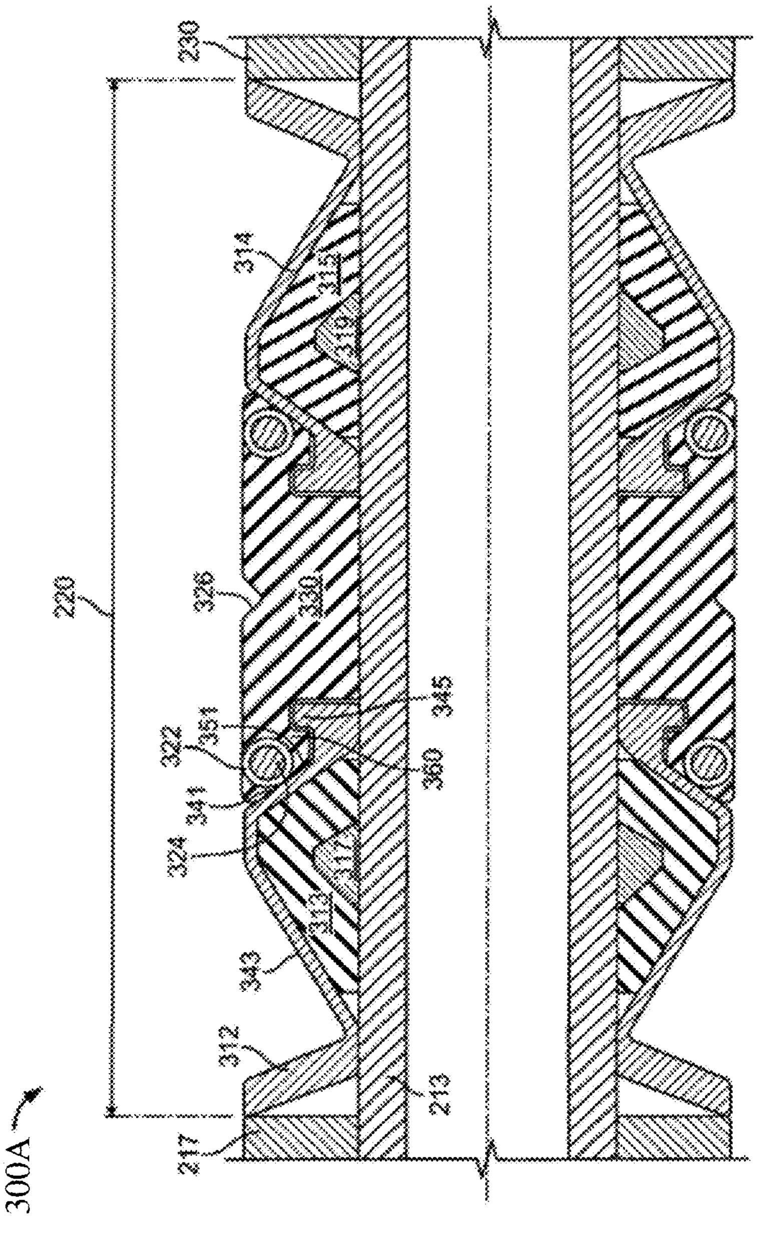
FIGS. 3A and 3B illustrate detailed cross-sectional side views of a seal assembly for the example bridge plug illustrated in FIG. 2A at various different operational states, designed, manufactured and/or operated according to one or more embodiments of the disclosure.
Figure 3B:
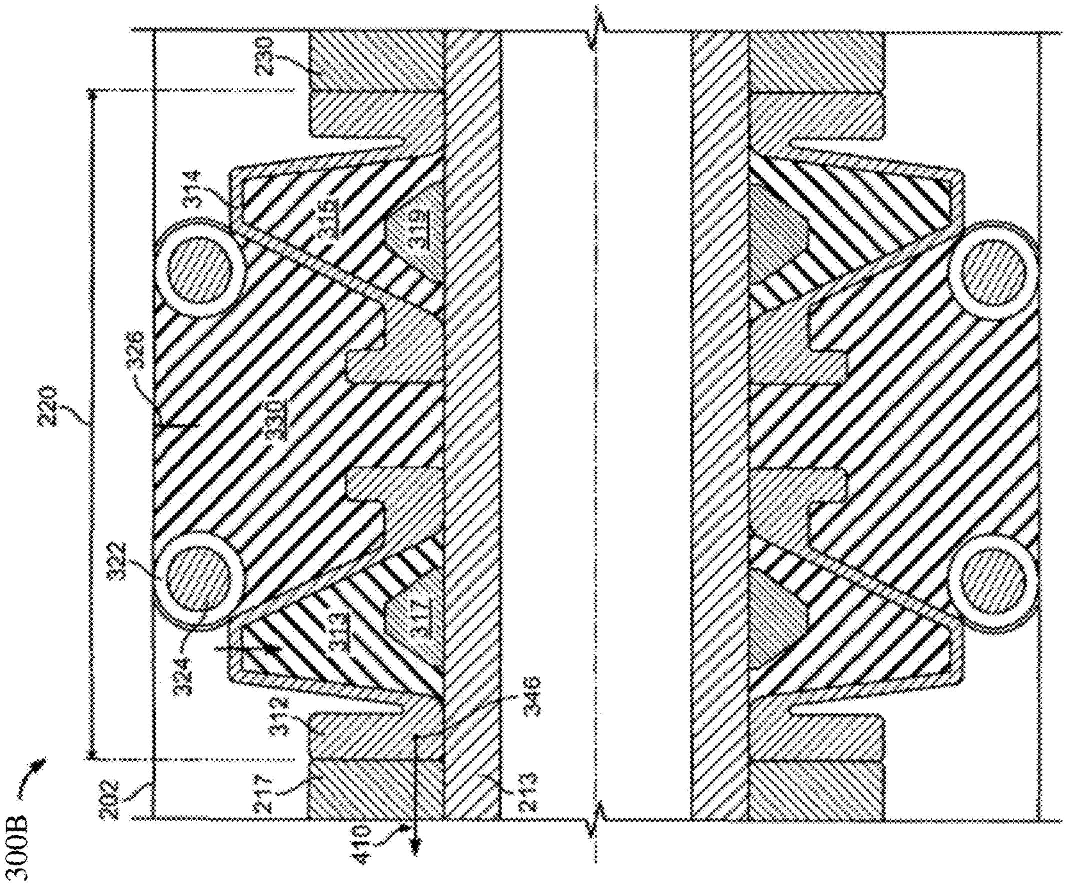

FIGS. 3A and 3B are detailed cross-sectional side views of a seal assembly 220, such as for the example the bridge plug 200 illustrated in FIG. 2A at various different operational states, designed, manufactured and/or operated according to one or more embodiments of the disclosure. The seal assembly 220, however, could also be used in other types of seal tools that axially compress the seal assembly 220 to set the seal assembly 220.

FIG. 3A illustrates the seal assembly 220 in an unset state 300A, and FIG. 3B illustrates the seal assembly 220 in a set state 300B. In FIG. 3A, the seal assembly 220 includes seal element 330 (e.g., an elastomer seal element), a garter spring 322, and two anti-extrusion rings 312 and 314. The seal element 330 can be compressed between the two anti-extrusion rings 312 and 314 to expand radially for sealing an annular gap between the bridge plug 200 and the wall of the wellbore. The two anti-extrusion rings 312 and 314 can radially extend to axially support the seal element 330 from excessive deformation due to high pressures and/or prolonged exposure to high temperature. In the unset state 300A, the elastomer seal element 330 and the anti-extrusion rings 312, 314 have not been compressed or deformed and they are radially compact. In the set state 300B (FIG. 3B), they are compressed and radially expanded to seal the annular gap between the bridge plug 200 and the wall of the wellbore 204.

In one or more embodiments, one or more garter springs 322 are coupled with the seal element 330 adjacent to both the uphole and downhole axial ends of the seal element 330. For example, in the illustrated embodiment of FIG. 3A, the one or more garter springs 322 are embedded in the seal element 330 adjacent to both the uphole and downhole axial ends of the seal element 330. As described below in FIG. 3B, the one or more garter springs 322 may span the gap between the anti-extrusion rings 312 and 314 and the wall of wellbore 202 when in the set state.

The seal element 330 is annular and encircles the inner mandrel 213. The seal element 330 can experience substantial deformation (e.g., radially expanded to over 110% of the original outer diameter) without failure (e.g., tear, wear, breakage, etc.) For example, the seal element 330 can be made of a viscoelastic material that has a low Young's modulus and a high yield strain, such as an elastomer or viscoelastic polymer. The elastomer or viscoelastic polymer can deform to fit a confined shape when a load is applied and return to the near original shape when the load is removed. For instance, the seal element 330 can be made of Butyl rubber, chloroprene rubber, polybutadiene, polyisoprene, nitrile rubber, or other material. The seal element 330 can further include an annular groove 326 on its outer surface, intermediate its ends. The annular grove 326 delays radial expansion of the seal element 330 by allowing the seal element 330 to initially fold inward (rather than radially deform) when compressed.

The anti-extrusion ring 312 encircles the inner mandrel 213. The anti-extrusion ring 312 can be compressed by a portion 217 of the setting sleeve 211 that slides axially on the inner mandrel 213. In certain instances, the end of the anti-extrusion ring 312 is affixed to the portion 217 of the setting sleeve 211, but in other instances it can be merely abutting the portion 217 of the setting sleeve 211. The setting sleeve 211 slides toward the seal element 330 and anti-extrusion ring 312 axially compressing them both. The anti-extrusion ring 312, in one embodiment, is made of metal, such as spring steel and/or another metal. It may include multiple annular walls (three shown) at non-zero angles to one another that fold when the anti-extrusion ring 312 is compressed. Particularly, an annular wall 341 may be oriented toward an axial end of the seal element 330, and an annular wall 343 may be oriented away from an axial end of the seal element 330.

In the unset state 300A shown in FIG. 3A, the annular walls 341 and 343 are radially compact and form a non-zero (acute or obtuse) angle with each other. The annular walls 341 and 343 may be configured to stand radially outward toward, but leave a gap with, the wellbore wall 204 when axially compressed to the set state. Thus, when compressed to the set state 300B, shown in FIG. 3B, the walls 341 and 343 may move relative to one another to fold to an acute angle (near parallel) with each other.

The annular walls 341 and 343 define an interior annular cavity. An elastomer ring 313 fills the annular cavity. Upon compression, the elastomer ring 313 deforms with the anti-extrusion ring 312 to continue to fill the annular cavity as the cavity changes shape, and further operates in pushing the annular walls 341 and 342 to stand radially outward. The elastomer ring 313 can be made of the same or similar material as the seal element 330, such as Butyl rubber, and/or another material. In some implementations, an annular wedge 317 is included in the elastomer ring 313. The annular wedge 317 is made of a substantially more rigid material, such as metal and/or another material, than the elastomer ring 313. The annular wedge can slide on the inner mandrel 213, and due to its wedge shape, further operates in forcing the elastomer ring 313 to push the annular walls to stand radially outward.

The anti-extrusion ring 312 can further include a hook portion with an annular shoulder 345 oriented toward the wall 341. The seal element 330 includes a corresponding receptacle with an annular shoulder 360 oriented away from the wall 341. The annular shoulder 360 engages the annular shoulder 345 of the anti-extrusion ring 312 linking the anti-extrusion ring 312 and seal element 330. The shoulders 345 and 360 can engage to pull when the seal assembly 220 is releasing from the set state to the unset state. For example, in releasing the plug to the unset state, the portion 217 of the setting sleeve 211 is moved axially away from the seal element 330. The portion 217 of the setting sleeve 211 pulls and axially expands (and radially retracts) the anti-extrusion ring 312. The anti-extrusion ring 312, in turn, is configured to grip the shoulder 360 of the seal element 330 with the shoulder 345 of the anti-extrusion ring 312 and further operates in axially extending (and radially retracting) the seal element 330 back toward the radially compact, unset state.

The anti-extrusion ring 314 is similar to the anti-extrusion ring 312 and is placed in a symmetrical position about the seal element 330. The anti-extrusion ring 314 also includes an elastomer ring 315 and an annular wedge 319. The anti-extrusion ring 314 abuts the seal element 330 on one side and is affixed to the slip assembly 230 on the other. During compression, the portion 217 of the setting sleeve 211 moves the seal assembly 220 toward the slip assembly 230. The compression actuates the slip assembly 230 to radially expand toward the wellbore 202. The compression also compresses the seal element 330 between the anti-extrusion rings 314 and 312. When the slip assembly 230 fully grips onto the wellbore wall 204, the slip assembly 230 can function as a stop for the seal assembly 220 to allow for the seal element's 330 full expansion. In unsetting the plug, the anti-extrusion ring 314 may also grip a shoulder of the seal element 330 with a shoulder of the anti-extrusion ring 314 and further operates in axially extending (and radially retracting) the seal element 330 back toward the radially compact, unset state.

In FIG. 3B, the bridge plug 200 is fully axially compressed and radially expanded to form a seal with the wellbore wall 204. In certain instances, in this set state 300B, the outer diameter of the seal element 330 is at least 110% larger, and in some instances at least 120% larger, than the outer diameter of the seal element 330 in the unset state 300A. The seal is realized by deforming the seal element 330 to fill a space created by the wellbore wall 204, the garter spring 322, the anti-extrusion rings 312 and 314, and the outer surface of the inner mandrel 213.

The garter spring 322, in one or more embodiments, is configured to span the gap between the anti-extrusion ring 312/314 and the wellbore wall 204 and reinforce the seal element 330 against axial deformation through the gap between the anti-extrusion ring 312/314 and the wellbore wall 204. In some implementations, the garter spring 322 is filled with one or more balls 324 (e.g., metal balls). The balls 324 can provide further reinforcement against deformation of the seal element 320 through the gap. In some implementations, the garter spring 322 is configured to bridge a gap of 9.5 mm (0.375 inches) or greater, and in some instances, 12.7 mm (0.5 inches) or greater. In certain instances, the seal element 330 can When the bridge plug 200 is retrieved, the setting sleeve 211 and seal assembly 230 are pulled axially apart. The ends of anti-extrusion rings 312/314 move with the setting sleeve 211 and seal assembly 230 to axially expand, unfold and radially contract. The elastomer rings 313/315 tend to spring back to their initial axially expanded state and act on the anti-extrusion rings 312/314 to additionally operate in axially expanding the anti-extrusion rings 312/314. While the seal element 330 somewhat tends to spring back to its initial radially retracted state, the anti-extrusion rings 312/314 grip and axially pull on the seal element 330 to additionally operate in radially retracting the seal element 330.

As the plug 200 is being withdrawn from the wellbore, the seal assembly 220 resists hanging up on the interior of the wellbore. The annular walls of the anti-extrusion rings 312/314 present a ramped surface to any irregularities in the wellbore wall that tend not to grip or hang on the wall. For example, the annular wall 343 of the uphole extrusion ring 312, when retracted or partially retracted, forms an acute angle with the axial centerline of the plug and with the wellbore wall and defines an uphole facing ramped surface. Similarly, the annular wall 341 of the downhole extrusion ring 314, when retracted or partially retracted, forms an acute angle with the axial centerline of the plug and with the wellbore wall and defines another uphole facing ramped surface. If ramped surfaces contact the wellbore wall, they slide over the wall, including any irregularity, and guide the seal element 330 out of contact with the wall. Additionally contact with the wellbore wall applies force near an outer diameter of the anti-extrusion rings 312/314 that further pushes the anti-extrusion rings 312/314 radially inward and makes more clearance to pass irregularities. In instances where the anti-extrusion rings 312/314 are metal, the hard surface of the metal has low friction with the wellbore wall and can withstand multiple impacts.

The present disclosure has recognized, for the first time, that during the setting of a plug, such as the plug 200 discussed above, the seal assembly 220 may suffer internal linear cracking that is parallel to the plug when axial pressure is applied. The present disclosure has further recognized, again for the first time, that the areas that such cracking occurred is in the rubber volume between the outer garter spring, inner garter spring and the balls internal thereto. The present disclosure has recognized that the cracks allow pressure to escape through from above to below and vice versa, which affects the ability of the seal assembly 220 properly seal against the wellbore.

Given the foregoing, the present disclosure has developed an improved garter spring that addresses this problem. Specifically, the present disclosure envisions positioning a spacer element (e.g., backup member) within the coiled spring member, for example in gaps between the plurality of spaced balls internal thereto. The present disclosure has found that the inclusion of the spacer elements to reinforce the rubber volume between the spaced balls greatly reduces the chances of cracking occurring, which will result in better sealability.

In at least one embodiment, the spacer elements are a series of small springs, for example with inside diameters (IDs) smaller than the outside diameters (ODs) of the balls, which are inserted in gaps between the plurality of spaced balls. The series of small springs, in one or more embodiments, are configured to help reinforce the rubber volume between each spaced ball. The series of small springs also help to maintain the position of each of the spaced balls, so that during production of the seal assembly, the spaced balls will maintain their position, allowing each ball to be evenly spaced. With the inclusion of the series of small springs, the rubber volume is reinforced, which helps to reduce any form of cracking and significantly reduces any internal stresses.

Figure 4:
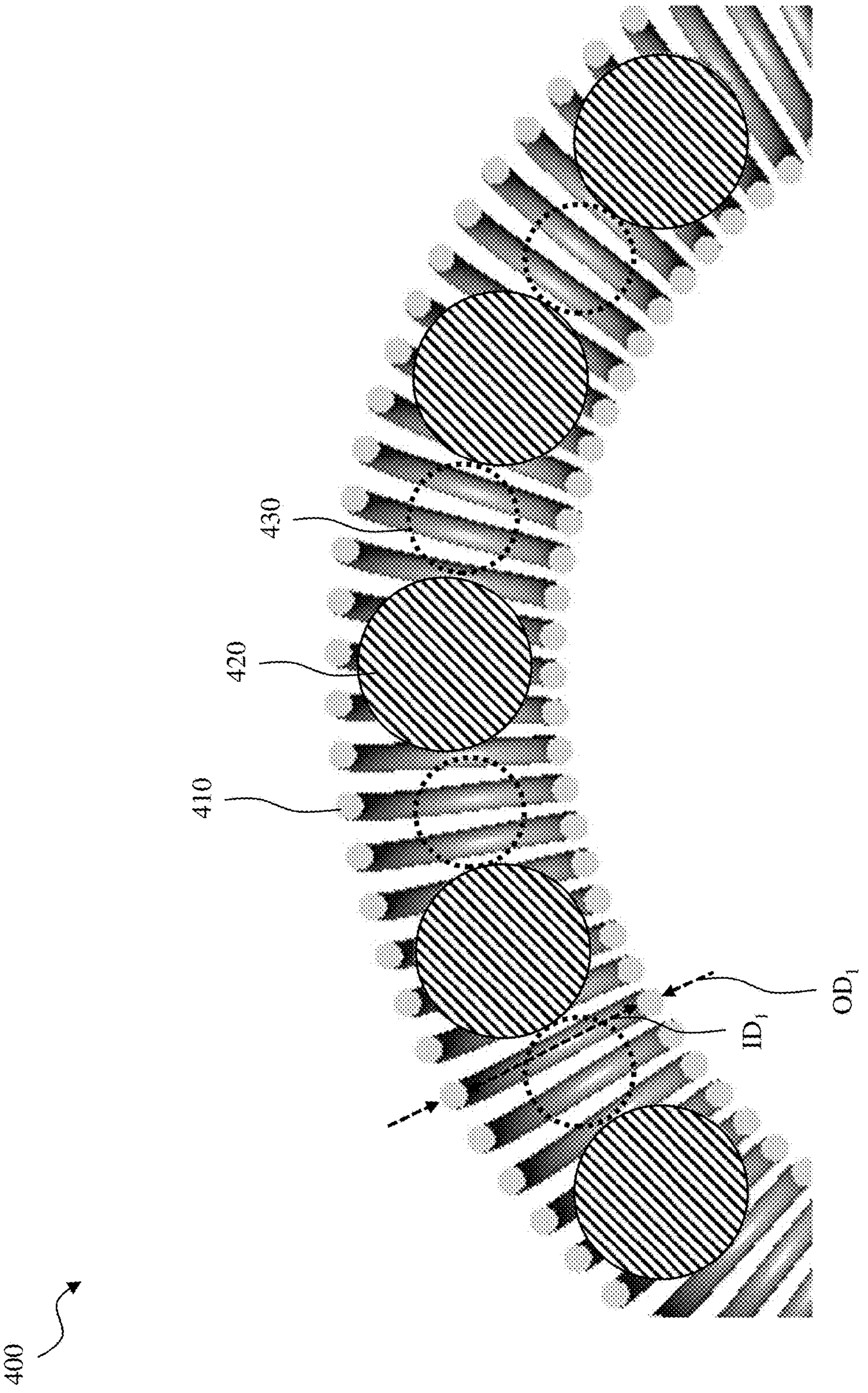
FIG. 4 illustrates a garter spring designed, manufactured and/or operated according to one or more embodiments of the disclosure, and as might be used in the bridge plug disclosed in FIGS. 2A through 2D.

Turning to FIG. 4, illustrated is a garter spring 400 designed, manufactured and/or operated according to one or more embodiments of the disclosure, and as might be used in the bridge plug 200 disclosed in FIGS. 2A through 2D. The garter spring 400, in the illustration of FIG. 4, includes a coiled spring 410 member having an inside diameter ($ID_1$) and an outside diameter ($OD_1$). In one or more embodiments, the coiled spring member 410 is a metal coiled spring member, the ends of which are coupled together to form a single continuous spring. For example, in one or more embodiments, the ends of the coiled spring member 410 are welded together, soldered together, etc. to form the single continuous spring.

The garter spring 400 of FIG. 4 additionally includes a plurality of spaced balls 420 (e.g., brass balls) located within the inside diameter ($ID_1$) of the coiled spring member 410. In the illustrated embodiment, gaps 430 exist between the plurality of spaced balls 420. The present disclosure has recognized that these gaps 430 may lead to the aforementioned cracking of the seal assembly that the garter spring may be used within.

Figure 5:
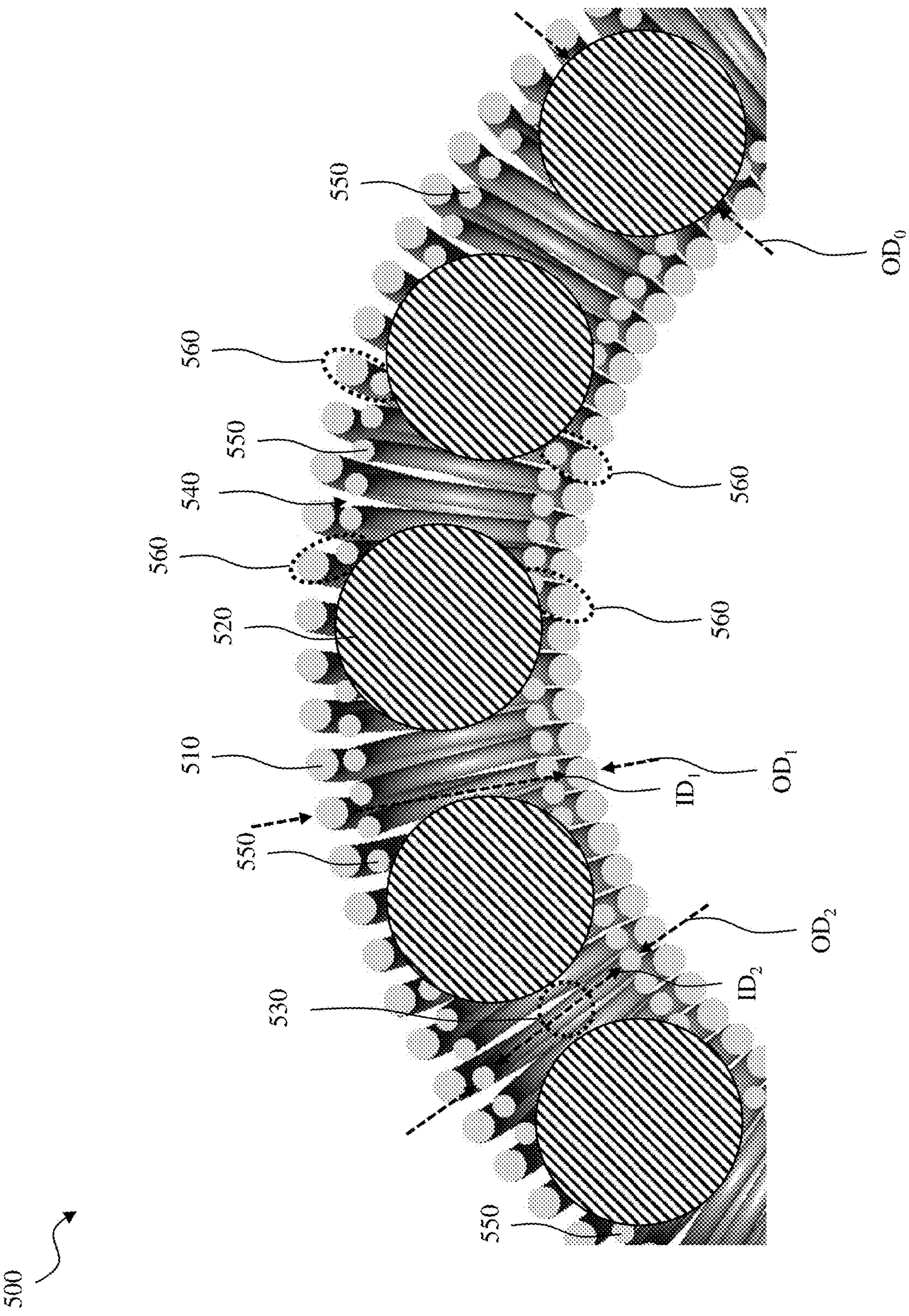
FIG. 5 illustrates a garter spring designed, manufactured and/or operated according to one or more alternative embodiments of the disclosure, and as might be used in the bridge plug disclosed in FIGS. 2A through 2D.

Turning to FIG. 5, illustrated is a garter spring 500 designed, manufactured and/or operated according to one or more embodiments of the disclosure, and as might be used in the bridge plug 200 disclosed in FIGS. 2A through 2D. The garter spring 500 includes a coiled spring member 510 having an inside diameter ($ID_1$) and an outside diameter ($OD_1$), as well as a plurality of spaced balls 520 located within the inside diameter ($ID_1$) of the coiled spring member 510. The garter spring 500, in contrast to the garter spring 400 of FIG. 4, additionally includes ones of spacer elements 540 located in the gaps 530 that exist between the plurality of spaced balls 520.

The ones of spacer elements 540 may comprise a variety of different types, shapes, materials, etc. and remain within the scope of the present disclosure. In at least one embodiment, such as that shown in FIG. 5, the ones of spacer elements 540 are ones of springs 550 (e.g., coiled springs) having an inside diameter ($ID_2$) and an outside diameter ($OD_2$) located in the gaps 530 between the plurality of spaced balls 520. In one or more embodiments, the outside diameter ($OD_2$) of the ones of springs 550 are only slightly smaller than the inside diameter ($ID_1$) of the coiled spring member 510. Similarly, in at least one embodiment the inside diameter ($ID_2$) of the ones of springs 550 are slightly smaller than the outside diameter ($OD_0$) of the plurality of spaced balls 520. Accordingly, the ones of spacer elements 540, which comprise the ones of springs 550 in the embodiment shown, hold each of the plurality of balls 520 in a predetermined position. For example, in at least one embodiment the ones of spacer elements 540 are positioned substantially equidistance (e.g., within 10 percent) within the coiled spring member 510, and thus position the plurality of spaced balls substantially equidistance apart.

Further to the embodiment of FIG. 5, each of the ones of spacer elements 540 may be fixedly coupled to the coiled spring member 510. For example, in the embodiment of FIG. 5 wherein the ones of spacer elements 540 are ones of springs 550, the ends of the ones of springs 550 may be fixedly coupled to the coiled spring member 510. For example, the ends of the ones of springs 550 may be welded to the coiled spring member 510 at couplings 560, among other locations. For example, radially interior ends of the ones of springs 550 may be welded with a radial interior side of the coiled spring member 510, and radial exterior ends of the ones of springs 550 may be welded with a radial exterior side of the coiled spring member 510. Additionally, welds are not required, and other forms of fasteners may be used.

Figure 6:
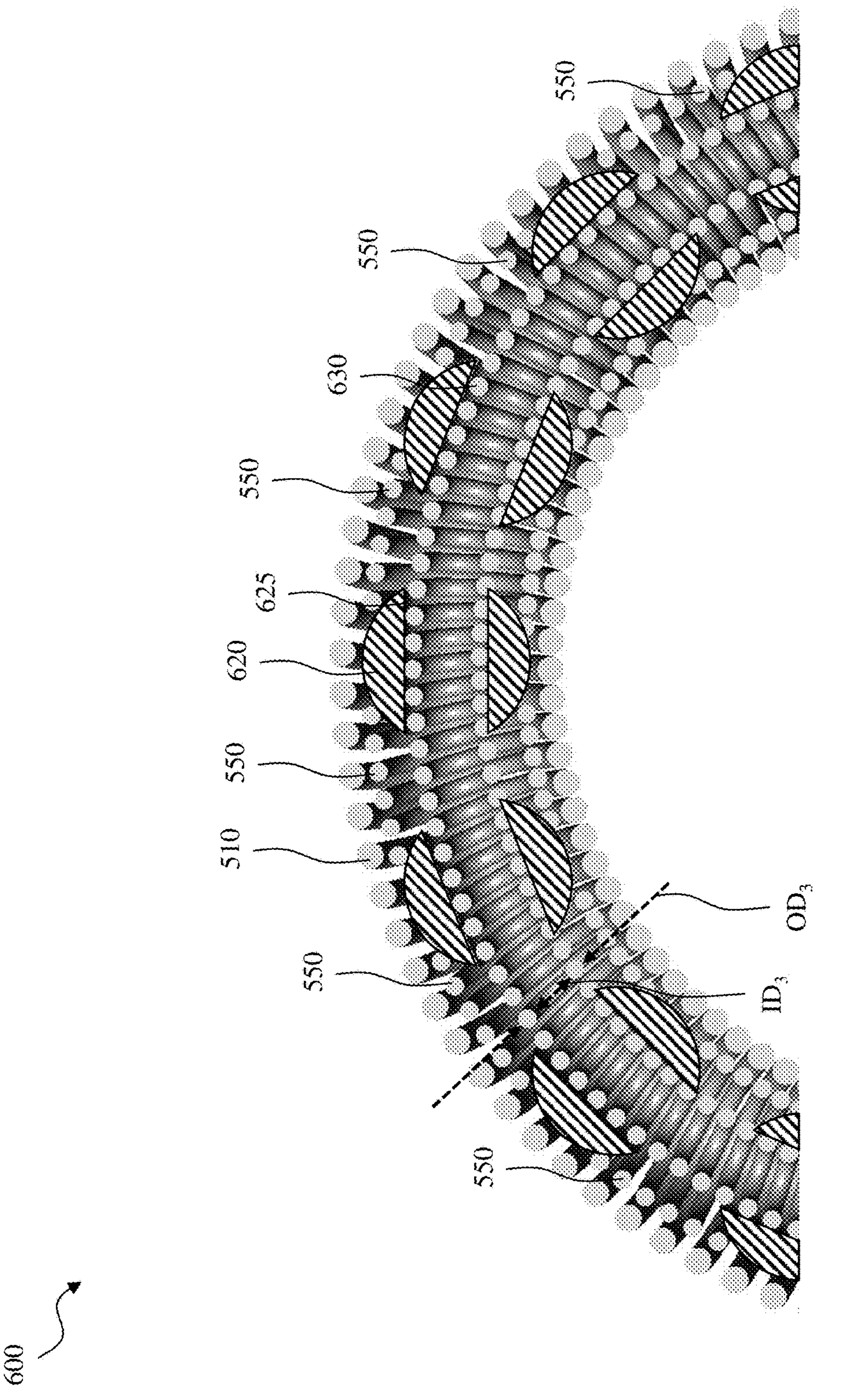
FIG. 6 illustrates a garter spring designed, manufactured and/or operated according to one or more alternative embodiments of the disclosure, and as might be used in the bridge plug disclosed in FIGS. 2A through 2D.

Turning to FIG. 6, illustrated is a garter spring 600 designed, manufactured and/or operated according to one or more embodiments of the disclosure, and as might be used in the bridge plug 200 disclosed in FIGS. 2A through 2D. The garter spring 600 of FIG. 6 is similar in many respects to the garter spring 500 of FIG. 5. Accordingly, like reference numbers have been used to indicate similar, if not identical, features. The garter spring 600 of FIG. 6 differs, for the most part, from the garter spring 500 of FIG. 5, in that the garter spring 600 employs a plurality of balls 620 having openings 625 therein (e.g., extending entirely therethrough). Further to the embodiment of FIG. 6, an inner coiled spring member 630 having an inside diameter ($ID_3$) and an outside diameter ($OD_3$) may be positioned within the openings 625 of the plurality of spaced balls 620.

Turning to FIG. 7, illustrated is a garter spring 700 designed, manufactured and/or operated according to one or more embodiments of the disclosure, and as might be used in the bridge plug 200 disclosed in FIGS. 2A through 2D. The garter spring 700 of FIG. 7 is similar in many respects to the garter spring 500 of FIG. 5. Accordingly, like reference numbers have been used to indicate similar, if not identical, features. The garter spring 700 of FIG. 7 differs, for the most part, from the garter spring 500 of FIG. 5, in that the garter spring 700 employs a plurality of balls 720 having openings 725 therein (e.g., extending entirely therethrough). Further to the embodiment of FIG. 7, one or more rods or tubes 730 (e.g., segmented rods or tubes) may be positioned within the openings 725 of the plurality of spaced balls 720.

Turning to FIGS. 8A through 8C, illustrated are various different views of a garter spring 800 designed, manufactured and/or operated according to one or more alternative embodiments of the disclosure, and as might be used in the bridge plug 200 disclosed in FIGS. 2A through 2D. The garter spring 800, in the illustration of FIGS. 8A through 8C, includes an outer coiled spring member 810 having an inside diameter ($ID_1$) and an outside diameter ($OD_1$). In one or more embodiments, the outer coiled spring member 810 is a metal coiled spring member, the ends of which are coupled together to form a single continuous spring. For example, in one or more embodiments, the ends of the outer coiled spring member 810 are welded together to form the single continuous spring.

The garter spring 800 of FIGS. 8A through 8C additionally includes a middle coiled spring member 820 having an inside diameter ($ID_2$) and an outside diameter ($OD_2$), for example located within the inside diameter ($ID_1$) of the outer coiled spring member 810. In one or more embodiments, the middle coiled spring member 820 is a metal coiled spring member, the ends of which are coupled together to form a single continuous spring. For example, in one or more embodiments, the ends of the middle coiled spring member 820 are welded together to form the single continuous spring. In one or other embodiments, the middle coiled spring member 820 is a collection of middle coiled spring member portions that collectively form the middle coiled spring member 820. The middle coiled spring member portions may be similar to the spacer elements disclosed above.

The garter spring 800 of FIGS. 8A through 8C additionally includes an inner coiled spring member 830 member having an inside diameter ($ID_3$) and an outside diameter ($OD_3$), for example located within the inside diameter ($ID_2$) of the middle coiled spring member 820. In one or more embodiments, the inner coiled spring member 830 is a metal coiled spring member, the ends of which are coupled together to form a single continuous spring. For example, in one or more embodiments, the ends of the inner coiled spring member 830 are welded together to form the single continuous spring. In one or other embodiments, the inner coiled spring member 830 is a collection of inner coiled spring member portions that collectively form the inner coiled spring member 830. The inner coiled spring member portions may be similar to the spacer elements disclosed above.

In one or more embodiments, the outer coiled spring member 810 and the inner coiled spring member 830 are wound in a first direction. In yet another embodiment, the middle coiled spring member 820 is wound in a second opposite direction to the first direction. In at least one embodiment, the middle coiled spring member 820 and the inner coiled spring member 830 provide a similar function as the one or more balls discussed above, and thus may replace the one or more balls in one or more different embodiments.

In one or more embodiments, as shown in FIG. 8C, adjacent twos of individual coils of the outer coiled spring member 810 are fixedly coupled together, the fixedly coupled adjacent twos interspaced around a circumference of the outer coiled spring member 810. In yet another embodiment, such as that shown in FIG. 8C, adjacent threes of individual coils of the outer coiled spring member are fixedly coupled together, the fixedly coupled adjacent threes interspaced around a circumference of the outer coiled spring member. In yet another embodiment, adjacent twos of individual coils of the middle coiled spring member 820 are fixedly coupled together, the fixedly coupled adjacent twos interspaced around a circumference of the middle coiled spring member 820. In even yet another embodiment, adjacent threes of individual coils of the middle coiled spring member 820 are fixedly coupled together, the fixedly coupled adjacent threes interspaced around a circumference of the middle coiled spring member 820. In even yet another embodiment, adjacent twos of individual coils of the inner coiled spring member 830 are fixedly coupled together, the fixedly coupled adjacent twos interspaced around a circumference of the inner coiled spring member 830. In yet even another embodiment, adjacent threes of individual coils of the inner coiled spring member 830 are fixedly coupled together, the fixedly coupled adjacent threes interspaced around a circumference of the inner coiled spring member 830. The garter spring 800 of FIGS. 8A through 8C may additionally be designed wherein: 1) adjacent twos of individual coils of the outer coiled spring member 810 are fixedly coupled together, the fixedly coupled adjacent twos interspaced around a circumference of the outer coiled spring member 810; 2) adjacent twos of individual coils of the middle coiled spring member 820 are fixedly coupled together, the fixedly coupled adjacent twos interspaced around a circumference of the middle coiled spring member 820; and 3) adjacent twos of individual coils of the inner coiled spring member 830 are fixedly coupled together, the fixedly coupled adjacent twos interspaced around a circumference of the inner coiled spring member 830.

Thus, in at least one embodiment, the coils of the outside coiled spring member 810 are coupled together (e.g., welded) between two or more coils (e.g., two, three, four, etc. coils) at specific intervals, as shown at coupling 815. In one or more embodiments, as shown in FIG. 8C, the coils of the middle coiled spring member 820 are coupled together (e.g., welded) between two or more coils (e.g., two to three coils) at specific intervals, as shown at coupling 825. In one or more embodiments, as shown in FIG. 8C, the coils of the inside coiled spring member 830 are coupled together (e.g., welded) between two or more coils (e.g., two to three coils) at specific intervals, as shown at coupling 835. In one or more embodiments, the couplings 815, 825, 835 are placed in a staggered manner, again as shown in FIG. 8C. Moreover, in certain embodiments, the outer coiled spring member 810 is coupled (e.g., welded) with the middle coiled spring member 820, and/or the middle spring member 820 is coupled (e.g., welded) with the inner coiled spring member 830. In other embodiments, neither of the outer, middle nor inner coiled spring members 810, 820, 830 are coupled together.

Aspects disclosed herein include:

A. A garter spring, the garter spring including: 1) a coiled spring member having an inside diameter ($ID_1$) and an outside diameter ($OD_1$); 2) a plurality of spaced balls located within the inside diameter ($ID_1$) of the coiled spring member; and 3) ones of spacer elements located in gaps between the plurality of spaced balls.

B. A downhole tool, the downhole tool including: 1) an elongate mandrel; and 2) a seal assembly encircling the mandrel, the seal assembly configured to move between an unset state and a set state, the seal assembly including: a) a seal element encircling the mandrel and configured to radially deform into contact with a wall of a wellbore when the seal assembly moves from the unset state to the set state; and b) a garter spring coupled with the seal element, the garter spring including: i) a coiled spring member having an inside diameter ($ID_1$) and an outside diameter ($OD_1$); ii) a plurality of spaced balls located within the inside diameter ($ID_1$) of the coiled spring member; and iii) ones of spacer elements located in gaps between the plurality of spaced balls.

C. A well system, the well system including: 1) a wellbore extending through one or more subterranean formations; and 2) a downhole tool positioned within the wellbore, the downhole tool including: a) an elongate mandrel; and b) a seal assembly encircling the mandrel, the seal assembly configured to move between an unset state and a set state, the seal assembly including: i) a seal element encircling the mandrel and configured to radially deform into contact with a wall of a wellbore when the seal assembly moves from the unset state to the set state; and ii) a garter spring coupled with the seal element, the garter spring including: a coiled spring member having an inside diameter ($ID_1$) and an outside diameter ($OD_1$), a plurality of spaced balls located within the inside diameter ($ID_1$) of the coiled spring member, and ones of spacer elements located in gaps between the plurality of spaced balls.

D. A garter spring, the garter spring including: 1) an outer coiled spring member having an inside diameter ($ID_1$) and an outside diameter ($OD_1$); 2) a middle coiled spring member having an inside diameter ($ID_2$) and an outside diameter ($OD_2$) located within the inside diameter ($ID_1$) of the outer coiled spring member; and 3) an inner coiled spring member having an inside diameter ($ID_3$) and an outside diameter ($OD_3$) located within the inside diameter ($ID_2$) of the middle coiled spring member.

E. A downhole tool, the downhole tool including: 1) an elongate mandrel; and 2) a seal assembly encircling the mandrel, the seal assembly configured to move between an unset state and a set state, the seal assembly including: a) a seal element encircling the mandrel and configured to radially deform into contact with a wall of a wellbore when the seal assembly moves from the unset state to the set state; and b) a garter spring coupled with the seal element, the garter spring including: i) an outer coiled spring member having an inside diameter ($ID_1$) and an outside diameter ($OD_1$); ii) a middle coiled spring member having an inside diameter ($ID_2$) and an outside diameter ($OD_2$) located within the inside diameter ($ID_1$) of the outer coiled spring member; and iii) an inner coiled spring member having an inside diameter ($ID_3$) and an outside diameter ($OD_3$) located within the inside diameter ($ID_2$) of the middle coiled spring member.

F. A well system, the well system including: 1) a wellbore extending through one or more subterranean formations; and 2) a downhole tool positioned within the wellbore, the downhole tool including: a) an elongate mandrel; and b) a seal assembly encircling the mandrel, the seal assembly configured to move between an unset state and a set state, the seal assembly including: i) a seal element encircling the mandrel and configured to radially deform into contact with a wall of a wellbore when the seal assembly moves from the unset state to the set state; and ii) a garter spring coupled with the seal element, the garter spring including an outer coiled spring member having an inside diameter ($ID_1$) and an outside diameter ($OD_1$), a middle coiled spring member having an inside diameter ($ID_2$) and an outside diameter ($OD_2$) located within the inside diameter ($ID_1$) of the outer coiled spring member, and an inner coiled spring member having an inside diameter ($ID_3$) and an outside diameter ($OD_3$) located within the inside diameter ($ID_2$) of the middle coiled spring member.

Aspects A, B, C, D, E and F may have one or more of the following additional elements in combination: Element 1: wherein the ones of spacer elements are ones of springs having an inside diameter ($ID_2$) and an outside diameter ($OD_2$) located in the gaps between the plurality of spaced balls. Element 2: wherein the ones of springs are ones of coiled springs. Element 3: wherein the ones of springs are fixedly coupled within the coiled spring member. Element 4: wherein the ones of springs are welded within the coiled spring member. Element 5: wherein radially interior ends of the ones of springs are welded with a radial interior side of the coiled spring member and radial exterior ends of the ones of springs are welded with a radial exterior side of the coiled spring member. Element 6: wherein the ones of spacer elements are positioned substantially equidistance within the coiled spring member. Element 7: wherein the plurality of spaced balls have openings extending entirely therethrough. Element 8: further including an inner coiled spring member having an inside diameter ($ID_3$) and an outside diameter ($OD_3$) positioned within the openings of the plurality of spaced balls. Element 9: further including one or more rods or tubes positioned within the openings of the plurality of spaced balls. Element 10: wherein the outer coiled spring member and the inner coiled spring member are wound in a first direction. Element 11: wherein the middle coiled spring member is wound in a second opposite direction to the first direction. Element 12: wherein adjacent twos of individual coils of the outer coiled spring member are fixedly coupled together, the fixedly coupled adjacent twos interspaced around a circumference of the outer coiled spring member. Element 13: wherein adjacent threes of individual coils of the outer coiled spring member are fixedly coupled together, the fixedly coupled adjacent threes interspaced around a circumference of the outer coiled spring member. Element 14: wherein adjacent twos of individual coils of the middle coiled spring member are fixedly coupled together, the fixedly coupled adjacent twos interspaced around a circumference of the middle coiled spring member. Element 15: wherein adjacent threes of individual coils of the middle coiled spring member are fixedly coupled together, the fixedly coupled adjacent threes interspaced around a circumference of the middle coiled spring member. Element 16: wherein adjacent twos of individual coils of the inner coiled spring member are fixedly coupled together, the fixedly coupled adjacent twos interspaced around a circumference of the inner coiled spring member. Element 17: wherein adjacent threes of individual coils of the inner coiled spring member are fixedly coupled together, the fixedly coupled adjacent threes interspaced around a circumference of the inner coiled spring member. Element 18: wherein: 1) adjacent twos of individual coils of the outer coiled spring member are fixedly coupled together, the fixedly coupled adjacent twos interspaced around a circumference of the outer coiled spring member; 2) adjacent twos of individual coils of the middle coiled spring member are fixedly coupled together, the fixedly coupled adjacent twos interspaced around a circumference of the middle coiled spring member; and 3) adjacent twos of individual coils of the inner coiled spring member are fixedly coupled together, the fixedly coupled adjacent twos interspaced around a circumference of the inner coiled spring member.

Those skilled in the art to which this application relates will appreciate that other and further additions, deletions, substitutions and modifications may be made to the described embodiments.

What is claimed is:

1. A garter spring, comprising:
a coiled spring member having an inside diameter ($ID_1$) and an outside diameter ($OD_1$);
a plurality of spaced balls located within the inside diameter ($ID_1$) of the coiled spring member; and
ones of spacer elements located in gaps between the plurality of spaced balls, wherein the ones of spacer elements are ones of springs having an inside diameter ($ID_2$) and an outside diameter ($OD_2$) located in the gaps between the plurality of space balls, and wherein the ones of springs are fixed coupled within the coiled spring member.

2. The garter spring as recited in claim 1, wherein the ones of springs are ones of coiled springs.

3. The garter spring as recited in claim 1, wherein the ones of springs are welded within the coiled spring member.

4. The garter spring as recited in claim 1, wherein radially interior ends of the ones of springs are welded with a radial interior side of the coiled spring member and radial exterior ends of the ones of springs are welded with a radial exterior side of the coiled spring member.

5. The garter spring as recited in claim 1, wherein the ones of spacer elements are positioned substantially equidistance within the coiled spring member.

6. The garter spring as recited in claim 1, wherein the plurality of spaced balls have openings extending entirely therethrough.

7. The garter spring as recited in claim 6, further including an inner coiled spring member having an inside diameter ($ID_3$) and an outside diameter ($OD_3$) positioned within the openings of the plurality of spaced balls.

8. The garter spring as recited in claim 6, further including one or more rods or tubes positioned within the openings of the plurality of spaced balls.

9. A downhole tool, comprising:
an elongate mandrel; and
a seal assembly encircling the elongate mandrel, the seal assembly configured to move between an unset state and a set state, the seal assembly including:
a seal element encircling the elongate mandrel and configured to radially deform into contact with a wall of a wellbore when the seal assembly moves from the unset state to the set state; and
a garter spring coupled with the seal element, the garter spring including:
a coiled spring member having an inside diameter ($ID_1$) and an outside diameter ($OD_1$);
a plurality of spaced balls located within the inside diameter ($ID_1$) of the coiled spring member; and
ones of spacer elements located in gaps between the plurality of spaced balls, wherein the ones of spacer elements are ones of springs having an inside diameter ($ID_2$) and an outside diameter ($OD_2$) located in the gaps between the plurality of space balls, and wherein the ones of springs are fixed coupled within the coiled spring member.

10. The downhole tool as recited in claim 9, wherein the ones of springs are ones of coiled springs.

11. The downhole tool as recited in claim 9, wherein the ones of springs are welded within the coiled spring member.

12. The downhole tool as recited in claim 9, wherein radially interior ends of the ones of springs are welded with a radial interior side of the coiled spring member and radial exterior ends of the ones of springs are welded with a radial exterior side of the coiled spring member.

13. The downhole tool as recited in claim 9, wherein the ones of spacer elements are positioned substantially equidistance within the coiled spring member.

14. The downhole tool as recited in claim 9, wherein the plurality of spaced balls have openings extending entirely therethrough.

15. The downhole tool as recited in claim 14, further including an inner coiled spring member having an inside diameter ($ID_3$) and an outside diameter ($OD_3$) positioned within the openings of the plurality of spaced balls.

16. The downhole tool as recited in claim 14, further including one or more rods or tubes positioned within the openings of the plurality of spaced balls.

17. A well system, comprising:
a wellbore extending through one or more subterranean formations; and
a downhole tool positioned within the wellbore, the downhole tool including:
an elongate mandrel; and
a seal assembly encircling the elongate mandrel, the seal assembly configured to move between an unset state and a set state, the seal assembly including:
a seal element encircling the elongate mandrel and configured to radially deform into contact with a wall of a wellbore when the seal assembly moves from the unset state to the set state; and
a garter spring coupled with the seal element, the garter spring including:
a coiled spring member having an inside diameter ($ID_1$) and an outside diameter ($OD_1$);
a plurality of spaced balls located within the inside diameter ($ID_1$) of the coiled spring member; and
ones of spacer elements located in gaps between the plurality of spaced balls, wherein the ones of spacer elements are ones of springs having an inside diameter ($ID_2$) and an outside diameter ($OD_2$) located in the gaps between the plurality of space balls, and wherein the ones of springs are fixed coupled within the coiled spring member.

18. A garter spring, comprising:
a coiled spring member having an inside diameter ($ID_1$) and an outside diameter ($OD_1$);

a plurality of spaced balls located within the inside diameter ($ID_1$) of the coiled spring member; and ones of spacer elements located in gaps between the plurality of spaced balls, wherein the plurality of spaced balls have openings extending entirely therethrough.

* * * * *